_United States Patent Office_

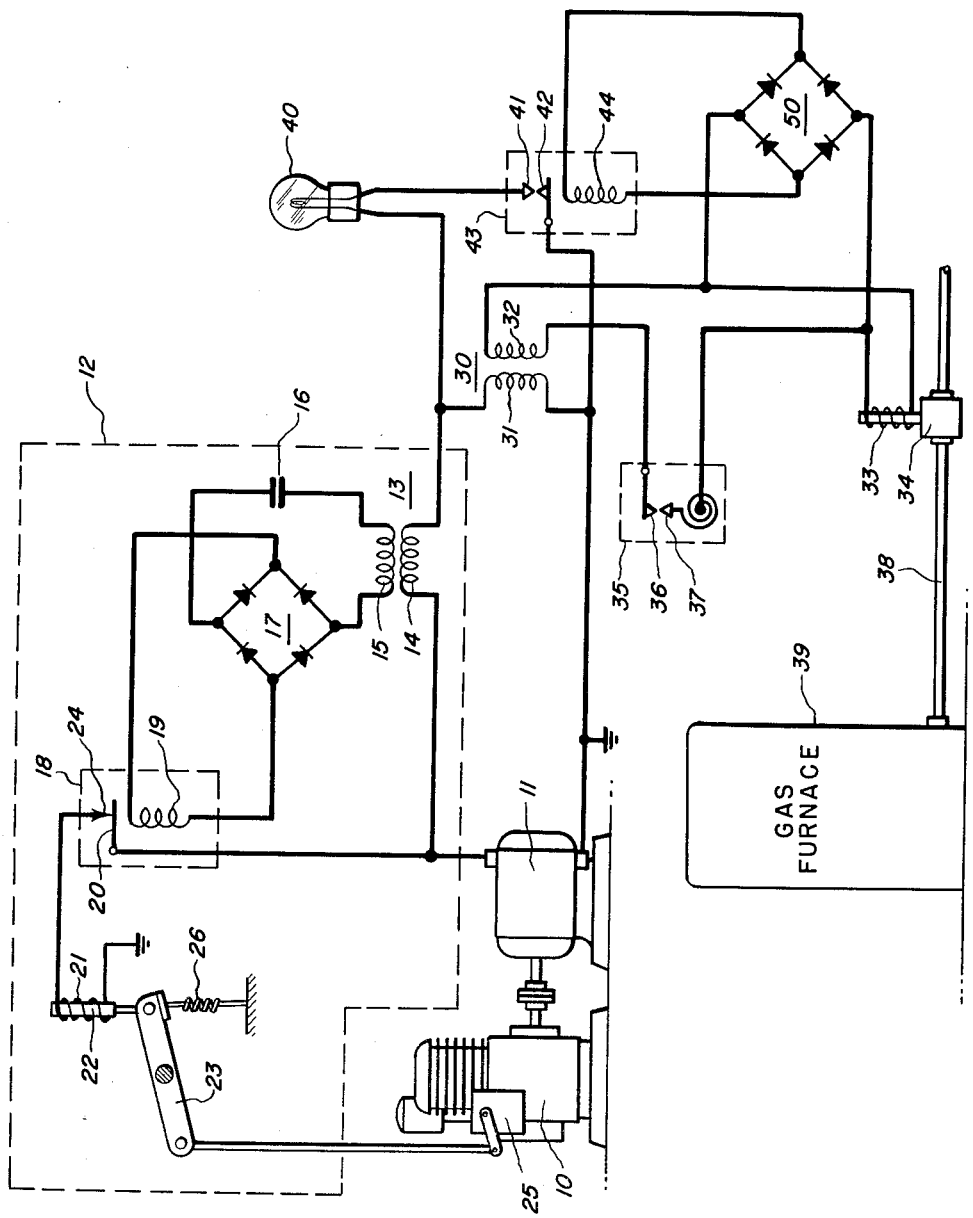

3,046,409
Patented July 24, 1962

3,046,409
SPEED CONTROL FOR ENGINE GENERATOR UNIT
Ronald A. Patnaude, Sioux City, Iowa, assignor to Wincharger Corporation, a corporation of Minnesota
Filed Mar. 23, 1959, Ser. No. 801,371
4 Claims. (Cl. 290—40)

This invention relates in general to engine-generator units and is directed in particular to a control system for controlling the operating speed of the engine.

In many instances where engine-generator units are employed as auxiliary or stand-by power supplies they must operate on an intermittent basis since the demand upon the generator output varies. In certain installations, it is desired for the sake of economy to change the speed of the engine automatically between an idling speed, under the conditions of no load, to a higher speed to provide rated output from the generator under operating load conditions. A control arrangement responsive to the demand imposed on the generator is therefore required in order to match the speed of the drive engine to this demand.

A known control arrangement for use with engine-generator units comprises a circuit which responds to the current drawn from the generator to energize a solenoid which operates a throttle on the engine. Generally, where a generator having a substantial output is employed, the speed control arrangement is designed to respond only to impressed loads greater than a predetermined minimum value since conditioning the speed control upon loads less than that value tends to effect erratic operation and may cause harm to the generator. Thus, in applications where the initial impressed load is a thermostat, a relay coil or other low-power device which draws an amount of current insufficient to actuate the speed control arrangement, the engine-generator in such a system fails to respond to this small demand. Known control circuits designed to accommodate and respond to impressed loads of extremely divergent values, as between a few watts and several kilowatts, are usually expensive and complex. Furthermore, with respect to pre-existing installations which must be altered in order to respond to low-power sensing devices the solution often entails a complete substitution of the original speed control arrangement.

It is therefore an object of the invention to provide a new and improved control system for use with an engine-generator and which overcomes the aforementioned difficulties.

It is also an object of the invention to provide a new and improved idling control system which is adapted for use with pre-existing engine-generator arrangements to enable response to extremely low values of impressed load.

In accordance with the invention there is provided a control system for use with an engine-generator unit having a speed control for changing the speed of the engine from an idling to an operating condition in response to the application on the generator of a load of predetermined value. The control system comprises a normally open first load circuit coupled to the generator and presents thereto a primary load of a value small with respect to the predetermined value; this load circuit includes the ultimate load device as the latter functions as part of the system. Means are provided for selectively closing this first load circuit. The system further includes a normally open auxiliary load circuit presenting a load of a value which together with the primary load value at least equals the predetermined value. The system also includes means responsive to closure of the first load circuit for closing the auxiliary circuit to impress a total load on the generator of a value at least equal to the predetermined value to which the speed control responds.

The features of the present invention which are believed to be novel are set forth with particularity in the appended claims. The organization and manner of operation of the invention, together with further objects and advantages thereof, may best be understood by reference to the following description taken in connection with the accompanying drawing, in which the single FIGURE illustrates a control system, partially in schematic form, in combination with an engine-generator unit.

The illustrated engine-generator unit comprises a motor 10 mechanically coupled to a generator 11. The engine includes a speed governor 25 tending to maintain proper engine speed to produce rated generator voltage. A speed control arrangement for changing the speed of engine 10 from an idling to an operating condition in response to application of a load of predetermined value upon the output terminals of generator 11 is shown within the dotted-line enclosure 12. This arrangement comprises a current transformer 13 having a primary winding 14 connected in series with the load circuit of the generator and a secondary winding 15 connected in series with a blocking condenser 16 and a bridge rectifier 17. A relay 18 includes an energizing coil 19 connected across the output terminals of rectifier 17, a movable contact 20 electrically connected to one output terminal of generator 11, and a fixed contact 24 conductively connected to one end of a solenoid 21 the other end of which is connected to the other generator output terminal through a common ground. A plunger 22, receivable within solenoid 21, is rigidly fixed to one end of a pivoted bell crank 23 which in turn is resiliently biased in a clockwise direction by a spring 26. The other end of crank 23 is mechanically coupled to speed governor 25 of drive engine 10. Contacts 20, 24 are in this case normally closed, as shown, and thereby act to energize solenoid 21 and override the governor, enforcing idling speed in the absence of a load demand in excess of the predetermined minimum value.

The control system for the engine-generator unit includes a normally open load circuit coupled to the generator and which presents thereto a primary load of a value small with respect to the load required for changing the speed of engine 10 from an idling to an operating condition. In this instance, this load circuit comprises a low voltage transformer 30 having a primary winding 31 coupled across the output terminals of generator 11. The secondary 32 of transformer 30 has one end electrically connected to one end of the energizing winding 33 of an electrically operated gas valve 34. Valve 34 is mounted upon gas line 38 between a source of gas, not shown, and a gas-fired furnace 39. Means are provided for selectively closing this primary load circuit; as shown, a thermostat 35 has a pair of normally open contacts 36, 37 that, when closed, electrically connect the other ends of secondary 32 and winding 33.

The control system further includes a normally open auxiliary load circuit which presents a load of a value which together with the value of the primary load at least equals that required for actuating speed control arrangement 12. Specifically, the auxiliary load circuit includes a resistive impedance which, for a control system of the type herein described, preferably comprises a 60-watt incandescent lamp 40. Lamp 40 is coupled across the output terminals of generator 11 through transformer primary winding 14 and a pair of normally open contacts 41, 42 of a relay 43 which includes an energizing coil 44.

The control system additionally includes means responsive to closure of the thermostatically controlled primary load circuit for closing the auxiliary load circuit so as to impress a total load on generator 11 sufficient to actuate the speed-control arrangement and thereby change the speed of engine 10 from an idling to an operating condition. This means includes a bridge rectifier 50 having its input connected across coil 33 and its output connected across coil 44.

In describing the operation of the subject apparatus, the engine-generator unit will be assumed to be initially operating at idling speed. In this mode of operation the output of generator 11 is insufficient to energize coil 19 with sufficient current to open the circuit energizing solenoid 21; thus, crank 23 acts to override governor 25 and maintain engine 10 at idling speed. Speed control arrangement 12 operates to change the speed of engine 10 from idling to operating condition only when a load current of predetermined value, specifically in this instance of about .4 amp, is drawn from generator 11. More particularly, when primary winding 14 of transformer 13 carries .4 amp, the energy developed in secondary 15 is applied to and is rectified by rectifier 17 to develop unidirectional energization for coil 19. Relay coil 19, upon energization, breaks contacts 20 and 24 to de-energize solenoid 21 and release plunger 22. Bell crank 23, under the influence of biasing spring 26, thereby permits governor 25 to take over. In consequence, engine 10 accelerates to operating speed.

While speed control 12 performs adequately when loads approximating .4 amp or greater are impressed upon the generator, the presence of a substantially smaller load does not actuate the speed control and thus the engine-generator remains at idling speed. The energizing coil 33 of gas valve 34, for example, comprises a load which draws substantially less than .4 amp. Since it is necessary to bring generator 11 to operating speed immediately upon closing of thermostat contacts 35, 36, in order to impress rated voltage across transformer 30 and thus insure positive operation of gas valve 34 and further to insure that rated output is available from generator 11 to drive blower motors and other equipment associated with furnace 39, the auxiliary load circuit automatically serves as a "false" load. Accordingly, upon closure of thermostat contacts 35, 36 rectifier 50 is energized and supplies unidirectional energizing current to coil 44 of relay 43. Upon energization of relay 43, normally open contacts 41, 42 are closed as a result of which incandescent lamp 40 is coupled across the generator output terminals to impress thereon a load sufficient to actuate speed control 12 and bring engine 10 up to operating speed.

The invention thus provides a novel control system for an engine-generator unit which reacts positively to insure rated generator output in response to minimum load conditions. Furthermore, the system is readily adaptable to pre-existing engine-generator installations and therefore constitutes a decidedly inexpensive expedient.

While a particular embodiment of the present invention has been shown and described, it is apparent that changes and modifications may be made therein without departing from the invention in its broader aspects. The aim of the appended claims, therefore, is to cover all such changes and modifications as fall within the true spirit and scope of the invention.

I claim:
1. For use in combination with an engine-generator unit having a speed control for changing the speed of the engine from an idling to an operating condition in response to application on the generator of a load of predetermined value, a control system comprising: a normally open first load circuit coupled to said generator and presenting thereto a primary load of a value small with respect to said predetermined value; means for selectively closing said first load circuit; a normally open auxiliary load circuit presenting a load of a value which together with said primary load value at least equals said predetermined value; and means responsive to closure of said first load circuit for closing said auxiliary load circuit to impress a total load on said generator of a value at least equal to said predetermined value.

2. For use in combination with an engine-generator unit having a speed control for changing the speed of the engine from an idling to an operating condition in response to the application across the generator output terminals of a load of predetermined value, a control system comprising: a normally open first load circuit coupled to said generator and presenting thereto a primary load of a value small with respect to said predetermined value; means for selectively closing said first load circuit; an auxiliary load comprising a resistive impedance presenting a load of a value which together with said primary load value at least equals said predetermined value; switch means comprising a normally open relay circuit coupled, in series with said impedance, across said output terminals; and means responsive to closure of said first load circuit for closing said relay circuit to impress on said generator a total load of a value at least equal to said predetermined value.

3. For use in combination with an engine-generator unit having a speed control for changing the speed of the engine from an idling to an operating condition in response to the application across the generator output terminals of a load of predetermined value, a control system comprising: a normally open first load circuit coupled to said generator and presenting thereto a primary load of a value small with respect to said predetermined value; means for selectively closing said first load circuit; an auxiliary load circuit comprising a substantially resistive impedance presenting a load of a value which together with said primary load value at least equals said predetermined value; a solenoid having a pair of normally open contacts coupling said auxiliary load across said generator ouput terminals; and means responsive to closure of said first load circuit for energizing said solenoid to close said contacts and thereby impress a total load on said generator of a value at least equal to said predetermined value.

4. For use in combination with an engine-generator unit having a speed control for changing the speed of the engine from an idling to an operating condition in response to the application across the generator output terminals of a load of predetermined value, a control system comprising: a normally open first load circuit coupled to said generator and presenting thereto a load of a value small with respect to said predetermined value; means for selectively closing said first load circuit; an auxiliary load circuit comprising a substantially resistive impedance presenting a load of a value which together with said primary load value at least equals said predetermined value; a direct-current operated solenoid having a pair of normally open contacts coupling said auxiliary load across said generator output terminals; and rectifier means responsive to closure of said first load circuit for energizing said solenoid to close said contacts and thereby impress a total load on said generator of a value at least equal to said predetermined value.

References Cited in the file of this patent
UNITED STATES PATENTS

| | | |
|---|---|---|
| 1,675,477 | Wilson | July 3, 1928 |
| 2,023,418 | Gustafson | Dec. 10, 1935 |
| 2,804,553 | McFarland | Aug. 27, 1957 |
| 2,815,974 | Stabbe | Dec. 10, 1957 |